United States Patent
Nakamura et al.

(10) Patent No.: US 11,525,917 B2
(45) Date of Patent: Dec. 13, 2022

(54) DISTANCE MEASURING APPARATUS WHICH DETECTS OPTICAL SYSTEM ABNORMALITY

(71) Applicant: FANUC CORPORATION, Yamanashi (JP)

(72) Inventors: Minoru Nakamura, Yamanashi (JP); Yuuki Takahashi, Yamanashi (JP); Atsushi Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 824 days.

(21) Appl. No.: 16/420,161

(22) Filed: May 23, 2019

(65) Prior Publication Data

US 2020/0033475 A1 Jan. 30, 2020

(30) Foreign Application Priority Data

Jul. 26, 2018 (JP) ................. JP2018-140430

(51) Int. Cl.
*G01S 17/36* (2006.01)
*G01S 17/89* (2020.01)
*G01S 7/4913* (2020.01)
*G01S 7/497* (2006.01)

(52) U.S. Cl.
CPC ............ *G01S 17/36* (2013.01); *G01S 7/4913* (2013.01); *G01S 17/89* (2013.01); *G01S 7/497* (2013.01)

(58) Field of Classification Search
CPC .............................. G01S 17/10; G01S 7/4865
See application file for complete search history.

(56) References Cited

U.S. PATENT DOCUMENTS

| | | | |
|---|---|---|---|
| 5,317,375 A | 5/1994 | Omamyuda et al. | |
| 2014/0111618 A1 | 4/2014 | Kumagai et al. | |
| 2019/0242984 A1* | 8/2019 | Yamane | G01S 17/10 |
| 2021/0325535 A1* | 10/2021 | Yasu | G01S 17/894 |

FOREIGN PATENT DOCUMENTS

| | | |
|---|---|---|
| CN | 102253392 A | 11/2011 |
| CN | 106707290 A | 5/2017 |
| JP | S63236909 A | 10/1988 |
| JP | H454428 A | 2/1992 |
| JP | H6289134 A | 10/1994 |
| JP | H815415 A | 1/1996 |
| JP | H10-227856 A | 8/1998 |
| JP | 2003302468 A | 10/2003 |
| JP | 2004-271404 A | 9/2004 |
| JP | 2005201868 A | 7/2005 |
| JP | 2005321319 A | 11/2005 |
| JP | 2009229255 A | 10/2009 |
| JP | 2010175278 A | 8/2010 |
| JP | 2010217077 A | 9/2010 |

(Continued)

*Primary Examiner* — Jerry T Jean Baptiste
(74) *Attorney, Agent, or Firm* — Hauptman Ham, LLP (57) ABSTRACT

A distance measuring apparatus includes an optical system abnormality detection section for detecting abnormalities of an optical system of the distance measuring apparatus by comparing a relationship between a measured distance value d and a light intensity Ls with a reference value $K_\rho$, $K_{\rho 1}$, $K_{L_s 0 d 0}$, or $K_{A b 0}$.

5 Claims, 9 Drawing Sheets

(56) References Cited

FOREIGN PATENT DOCUMENTS

| | | | |
|---|---|---|---|
| JP | 2010230613 | A | 10/2010 |
| JP | 2011117889 | A | 6/2011 |
| JP | 201373312 | A | 4/2013 |
| JP | 201448139 | A | 3/2014 |
| JP | 201474708 | A | 4/2014 |
| JP | 2014167414 | A | 9/2014 |
| JP | 2015502632 | A | 1/2015 |

* cited by examiner

| WHEN DISTANCE MEASURING APPARATUS IS NORMAL | WHEN ABNORMALITY IS DETECTED |

IDENTICAL OBJECTS
(REFLECTIVITY UNKNOWN)

DISTANCE MEASURING APPARATUS WHICH DETECTS OPTICAL SYSTEM ABNORMALITY

RELATED APPLICATIONS

The present application claims priority of Japanese Application Number 2018-140430, filed Jul. 26, 2018, the disclosure of which is hereby incorporated by reference herein in its entirety.

BACKGROUND OF THE INVENTION

1. Field of the Invention

The present invention relates to a distance measuring apparatus for measuring a distance to an object based on a time of flight of light, and in particular, relates to a distance measuring apparatus which detects optical system abnormality.

2. Description of Related Art

TOF (time of flight) cameras which output a distance based on the time of flight of light are known as a distance measuring apparatus for measuring the distance to the object. TOF cameras irradiate a target measurement space with distance measurement light which is intensity-modulated over predetermined cycles, and commonly use a phase difference method in which a phase difference between the irradiated measurement light and the light reflected by the object in the target measurement space is detected.

In such distance measuring apparatuses, distance measurement accuracy is reduced due to optical system abnormalities, whereby distance measurement capability may be lost. In particular, it is conventionally known that since TOF cameras, which are three-dimensional sensors, perform distance measurement by capturing the distance measurement light reflected by the subject, and when the reflected light becomes weak, effects of shot noise, dark current noise, thermal noise, etc., become relatively apparent, whereby variations in distance measurement values become large. The causes of weakness of the reflected light include a generally low reflectivity object, such as a black object, or a distant object, and additionally (1) adhesion of dirt to the lens, (2) adhesion of dirt to the diffusion plate for the distance measurement light, (3) output reduction in a distance measurement light source, and (4) optical system abnormalities such as light receiving element abnormalities. The following documents are known as prior art related to the detection of such optical system abnormalities.

Japanese Unexamined Patent Publication (Kokai) No. 2004-271404 discloses a vehicle obstacle detection device which emits a laser via a window cover and which receives reflected light to detect obstacles. In the vehicle obstacle detection device, the relationship between the intensity of light reflected by a road surface and time is estimated as an ideal reflection waveform, the relationship between the light actually reflected by the road surface and time is detected as an actual reflection waveform, and the presence of dirt on the window cover is detected based on the ideal reflection waveform and the actual reflection waveform.

Japanese Unexamined Patent Publication (Kokai) No. 10-227856 discloses a light beam sensor which detects the presence or absence and number of vehicles. In the light beam sensor, a light reception amount of a light beam reflected by a regressive reflection plate is monitored, and when the average light reception amount is equal to or less than a reference value which has been set in advance, it is determined that a reception/emission window, the regressive reflection plate, etc., is dirty.

SUMMARY OF THE INVENTION

Figure 7A:
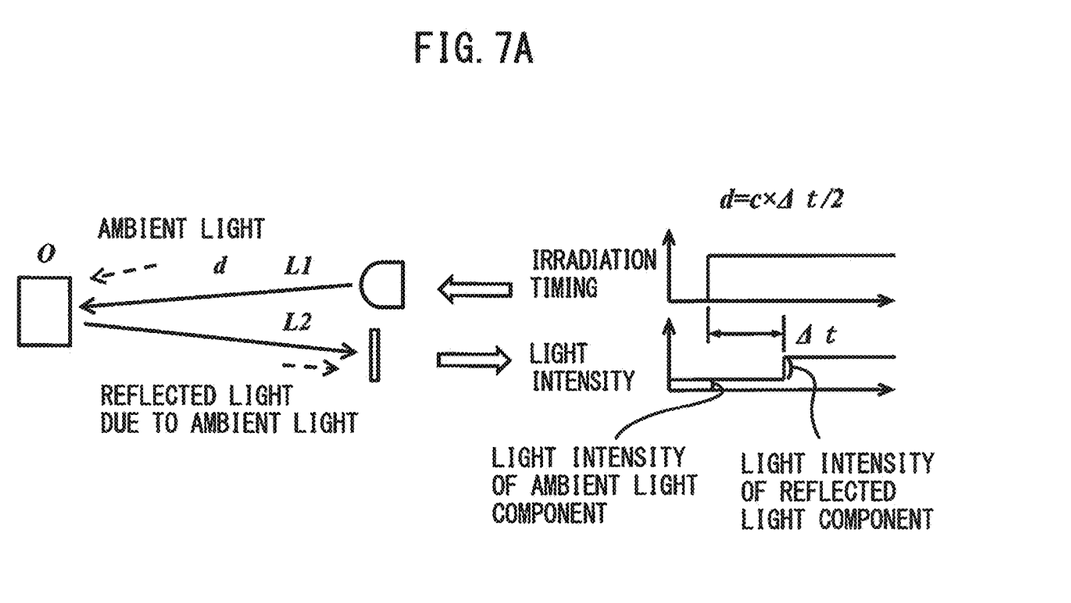
FIG. 7A is an explanatory view showing distance measurement theory according to prior art.
Figure 7B:
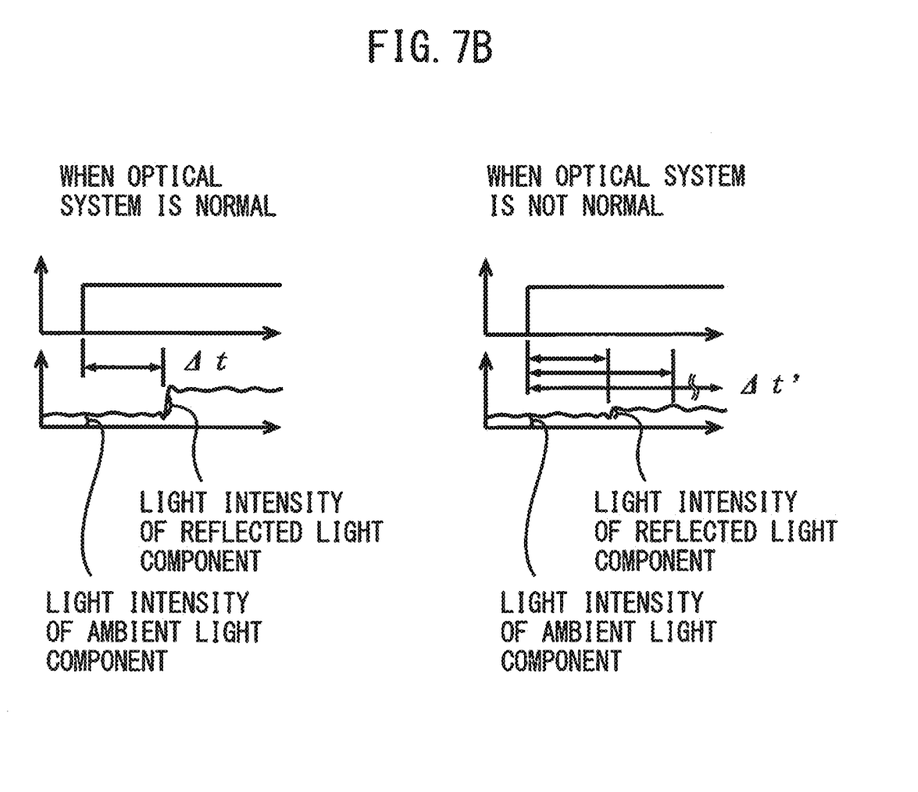
FIG. 7B is an explanatory view showing an S/N ratio when an optical system is normal according to prior art.

As shown in FIG. 7A, in a distance measuring apparatus in which distance is measured by irradiating an object O with distance measurement light L1, distance measurement is carried out by determining a time difference $\Delta t$ from irradiation to reception. Since the object O is also illuminated by ambient light, the distance measuring apparatus receives reflected light L2 with which light other than the distance measurement light L1 is mixed. As shown in FIG. 7B, when the optical system is normal, the light intensity of the ambient light component is generally constant. Thus, by subtracting the light intensity acquired when the distance measurement light is not irradiated, the S/N ratio can be ensured, and the light intensity of only the reflected light component can be detected.

However, as shown in FIG. 7B, when the optical system is not normal, the reflected light become weak, whereby the S/N ratio is reduced, misdetection or undetectability of the reflected light occurs, and a reduction in distance measurement accuracy or a loss of distance measurement capability occurs. Thus, in order to maintain stable distance measurement accuracy and distance measurement capability, it is necessary to detect optical system abnormalities. Furthermore, even when optical system abnormalities can be detected, if the cause of the abnormality cannot be understood, the appropriate timing for cleaning the distance measuring apparatus and the replacement of components cannot be understood.

Thus, a distance measuring apparatus with which optical system abnormalities can be easily detected is desired.

An aspect of the present disclosure provides a distance measuring apparatus, comprising an irradiation section which irradiates an object with distance measurement light, and a light receiving section which receives reflected light from the object, wherein the distance measuring apparatus outputs a distance measurement value to the object calculated based on a phase difference between the distance measurement light and the reflected light, and a light intensity of the reflected light, the distance measuring apparatus further comprising an optical system abnormality detection section which detects an abnormality of an optical system of the distance measuring apparatus by comparing the relationship between the distance measurement value and the light intensity with a reference value.

DESCRIPTION OF PREFERRED EMBODIMENTS

The embodiments of the present disclosure will be described in detail below with reference to the attached drawings. In the drawings, identical or similar constituent elements have been assigned the same or similar reference numerals. Furthermore, the embodiments described below do not limit the technical scope of the inventions described in the claims or the definitions of the terms.

Figure 1:
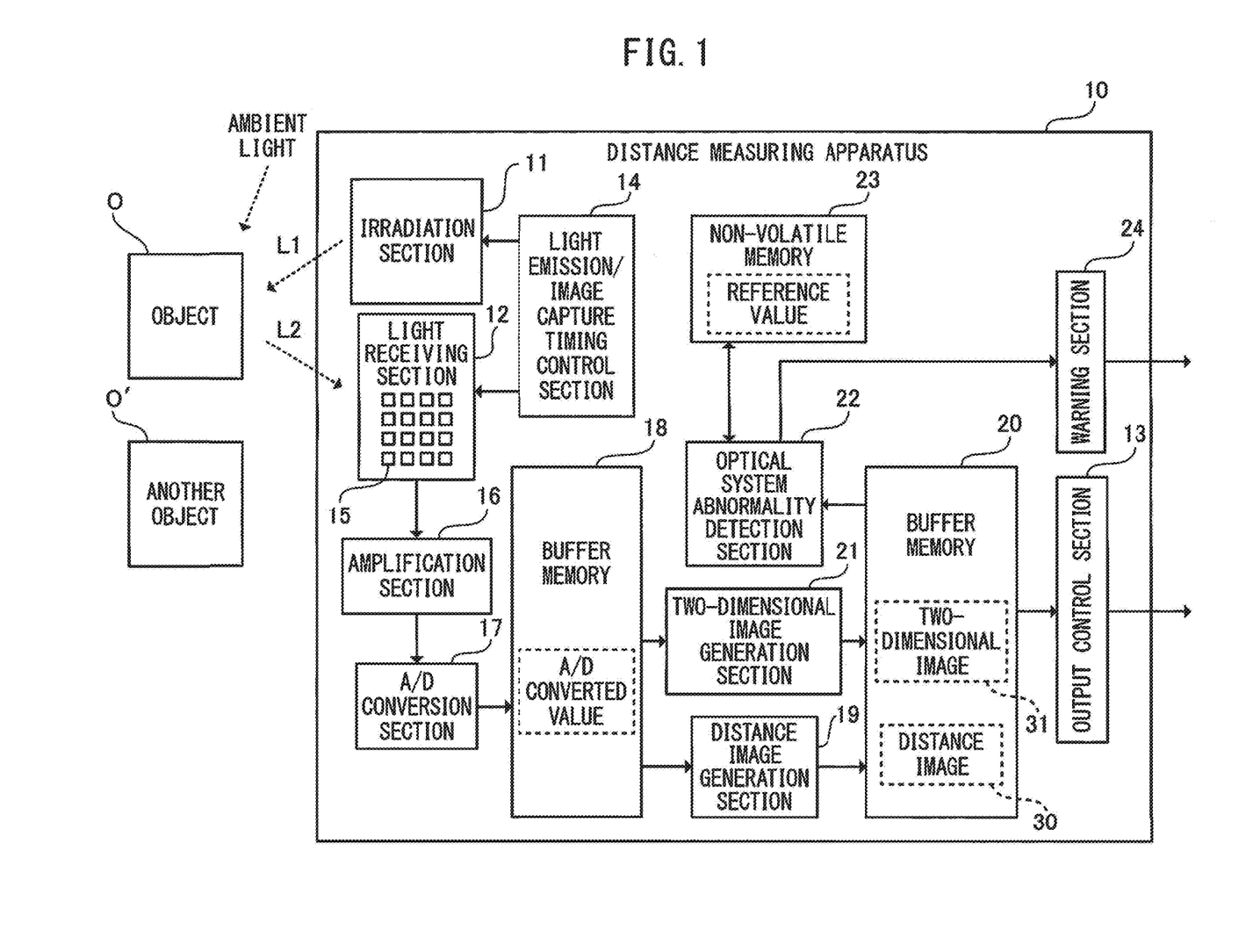
FIG. 1 is a block diagram of the distance measuring apparatus according to one embodiment.

FIG. 1 is a block diagram of the distance measuring apparatus 10 according to one embodiment. The distance measuring apparatus 10 is a TOF camera, laser scanner, etc., which measures the distance to an object based on, for example, a phase difference method, and comprises an irradiation section 11 which irradiates an object O with intensity-modulated distance measurement light L1, a light receiving section 12 which receives reflected light L2 from the object O, and an output control section 13 which outputs distance measurement values to the object and the light intensity of the reflected light based on the phase difference between the distance measurement light and the reflected light.

The irradiation section 11 is constituted by a distance measurement light source such as a light-emitting diode or a semiconductor laser which emits, for example, near-infrared (NIR) light, and a diffusion plate which diffuses the NIR light as the distance measurement light L1. The irradiation section 11 illuminates the object O with the distance measurement light L1 which is intensity modulated on a predetermined cycle based on a light emission timing signal from a light emission/image capture timing control section 14.

The light receiving section 12 is constituted by, for example, a condenser lens which focuses reflected light L2 from the object O, a photoelectric element which receives the reflected light L2 via an RGB filter, an NIR filter, etc., and a CCD imaging sensor, a CMOS imaging sensor, etc. The reflected light L2 includes reflected ambient light in addition to the distance measurement light L1 reflected by the object O. The light receiving section 12 may include, per pixel, four light receiving elements for receiving red light, blue light, green light, and NIR light, or may include, per pixel, a single light receiving element for receiving only NIR light. In some cases, the light receiving section 12 includes a plurality of two-dimensionally arranged light receiving elements 15.

In laser scanners, in general, the light receiving section 12 performs direct measurement of the delay Δt of the reflected light with respect to the irradiation timing of the reference light shown in FIGS. 7A and 7B or the light intensity of the reflected light components. The present embodiment will be described hereinafter under the assumption that the distance measuring apparatus 10 is a TOF camera. The light receiving element 15 is constituted by, for example, a photo diode, a capacitor, etc. A light receiving element 15 which receives NIR light acquires light reception amounts $Q_1$ to $Q_4$ at a plurality of image capture timings which are out of phase by 0°, 90°, 180°, and 270°, respectively, with respect to, for example, the light emission timing of the distance measurement light L1 based on an image capture timing signal from the light emission/image capture timing control section 14. A light receiving element 15 which receives red light, blue light, and green light acquires the respective light reception amounts over a predetermined image capture interval. The acquired light reception amounts are amplified by an amplification section 16, A/D converted by an A/D conversion section 17, and the A/D converted values are stored in a buffer memory 18.

A distance image generation section 19 generates a distance image 30 including the distance measurement value to the object O for each pixel based on the A/D converted values of the light reception amounts $Q_1$ to $Q_4$ of the NIR light. The distance measurement value d is calculated from, for example, the known formula below. Td is the phase difference between the distance measurement light and the reflected light, c is the speed of light, and f is the frequency of the distance measurement light. The generated distance image 30 is stored in a buffer memory 20, and is output to the outside of the distance measuring apparatus 10 via the output control section 13.

$$Td = \arctan\left(\frac{Q_2 - Q_4}{Q_1 - Q_3}\right) \qquad \text{[Formula 1]}$$

$$d = \frac{c}{4\pi f} Td \qquad \text{[Formula 2]}$$

A two-dimensional image generation section 21 generates a two-dimensional image 31 based on the A/D converted values of the light reception amounts of the RGB light or the NIR light. In other words, the two-dimensional image 31 may be an RGB image (color image), or may be an NIR image (monochrome image). The two-dimensional image 31 is stored in the buffer memory 20, and is output to the outside of the distance measuring apparatus 10 via the output control section 13. Note that when the distance measuring apparatus 10 is a TOF camera, the light intensity Ls output from the light receiving element 15 is calculated using, for example, the known formula below, based on the light reception amounts $Q_1$ to $Q_4$.

$$Ls = \frac{\sqrt{(Q_1 - Q_3)^2 + (Q_2 - Q_4)^2}}{2} \qquad \text{[Formula 3]}$$

As described above with reference to FIG. 7B, when the optical system is not normal, the reflected light becomes weak, whereby the S/N ratio is reduced, erroneous detection or undetectability of signal components of the distance measurement light occurs, and the distance measurement accuracy is reduced or loss of the distance measurement capability occurs. In order to detect such abnormalities of the optical system, and to maintain the distance measurement accuracy or distance measurement capability, the distance measuring apparatus 10 comprises an optical system abnormality detection section 22 which detects abnormalities of the optical system. The optical system abnormality detection section 22 can be constituted as software which causes, for example, a processor such as a central processing unit (CPU) to function. Alternatively, for example, the processing of at least some of such software may be executed as hardware such as an executable processor.

Figure 2A:
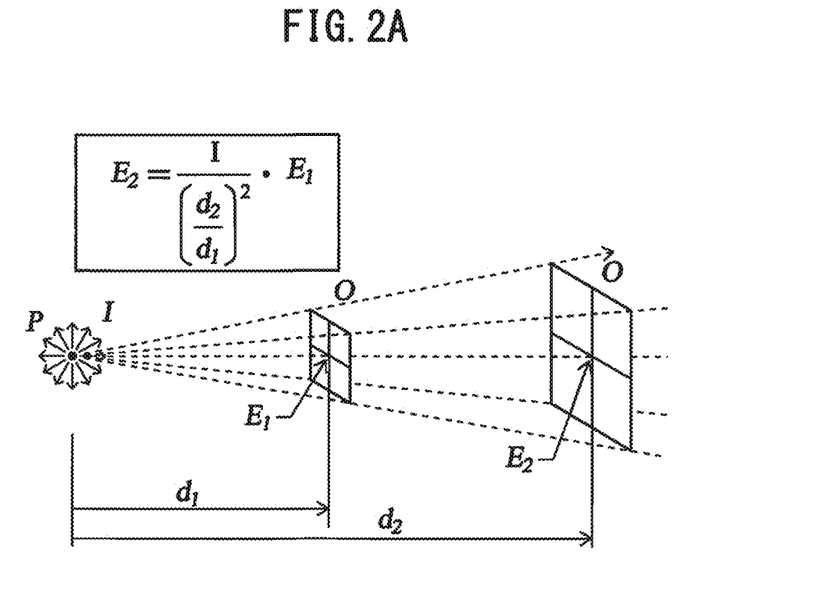
FIG. 2A is an explanatory view showing an optical system abnormality detection principle.
Figure 2B:
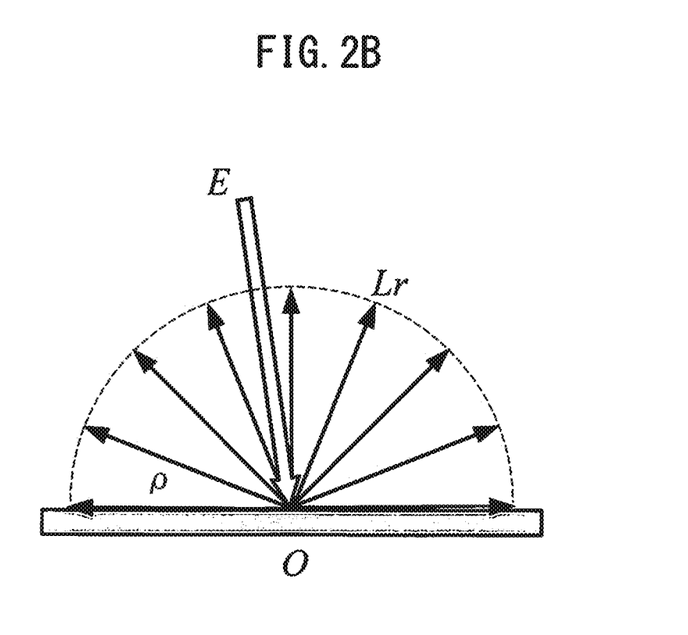
FIG. 2B is an explanatory view showing an optical system abnormality detection principle.
Figure 2C:
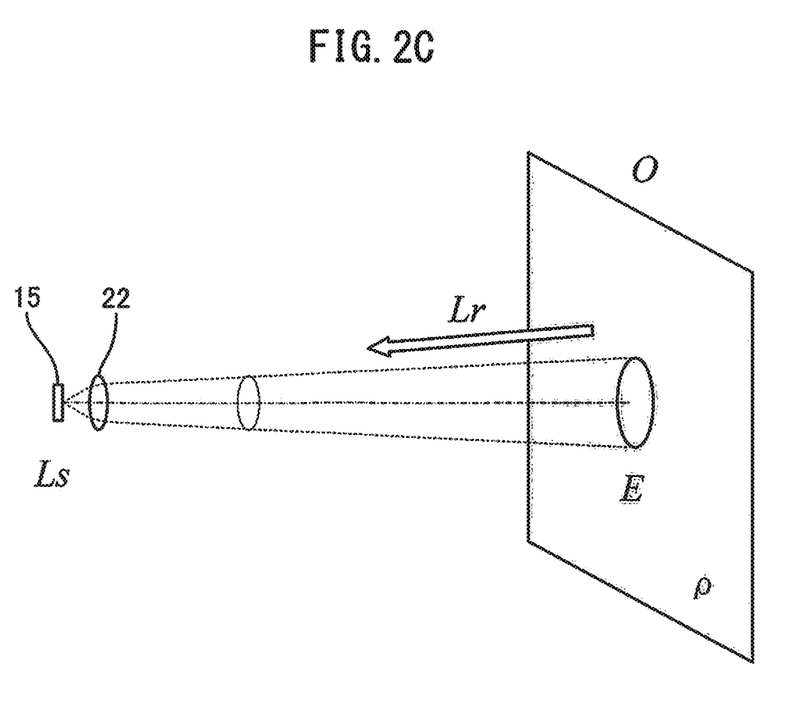
FIG. 2C is an explanatory view showing an optical system abnormality detection principle.

FIGS. 2A to 2C are explanatory views of the principle of detection of abnormalities of the optical system. As shown in FIG. 2A, the illuminance E from the distance measurement light source P toward the object is generally inversely proportional to the square of distance d, as in the following formula. I is the light intensity of the distance measurement light source P in the direction of observation.

$$E = \frac{I}{d^2} \quad \text{[Formula 4]}$$

Furthermore, as shown in FIG. 2B, when the object O has a uniformly diffusing reflective surface having a reflectivity of $\rho$, the luminance Lr of the reflective surface can be generally represented by the following formula.

$$Lr = \frac{\rho}{\pi} \cdot E \quad \text{[Formula 5]}$$

Further, as shown in FIG. 2C, the light receiving element 15 outputs an output current which is generally proportional to the incident luminous flux. Since the luminous flux received by the light receiving element 15, i.e., the light intensity Ls which is output by the light receiving element 15, is proportional to the luminance Lr of the surface of the light receiving element 15 searched for by the condenser lens 22, the following formula is obtained.

$$Ls \propto \frac{\rho}{\pi} \cdot \frac{I}{d^2} \quad \text{[Formula 6]}$$

When the above formula is expressed using the constant k, the following formula is obtained. The constant k is a correction value which offsets differences in apparatus structure, differences in the characteristic of each element with regards to light emission or reception, and the individual characteristic variations of each element.

$$Ls = k \cdot \frac{\rho \cdot I}{d^2} \quad \text{[Formula 7]}$$

The above formula can be changed to the following basic formula. Thus, a state in which the intensity I of the distance measurement light source in the direction of observation is constant and the distance of an object O having a reflectivity of $\rho$ is measured indicates that the relationship between the distance measurement value d to the object O on the left side of the following basic formula and the light intensity Ls received by the light receiving element 15 becomes a constant value. In other words, when detecting optical system abnormality, if the calculated results of the relationship between the distance measurement value d to the object O having a reflectivity of $\rho$ and the light intensity Ls received by the light receiving element 15 differs from a predetermined value, there is something wrong with the optical system of the distance measuring device 10.

$$Ls \cdot d^2 = k \cdot \rho \cdot I \quad \text{[Formula 8]}$$

Though the right side of the above basic formula includes the intensity I of the distance measurement light source in the direction of observation, this value is different for each distance measuring apparatus 10 due to characteristic variations of the parts constituting the distance measuring apparatus 10. When, for example, the distance measuring apparatus 10 is normal (e.g., at the time of shipment, at the time of installation, etc.), the reference value $K_\rho$ for detecting abnormality of the optical system is obtained from the distance measurement value d obtained by calibration using an object having a reflectivity of $\rho_{cb}$ and the light intensity Ls, as described in the following formula. The reference value $K_\rho$ is stored in a non-volatile memory 23 (refer to FIG. 1) of the distance measuring apparatus 10 along with the reflectivity $\rho_{cb}$ (like the reference value, which will be described later).

$$K_\rho = Ls \cdot d^2 \quad \text{[Formula 9]}$$

When detecting abnormality of the optical system, the optical system abnormality detection section 22 calculates the relationship between the light intensity Ls of the object O, which has a known reflectivity $\rho_{cb}$, and the distance measurement value d, and detects the abnormality Ab of the optical system of the distance measuring apparatus 10 by comparing such relationship with the reference value $K_\rho$. The abnormality Ab of the optical system may be detected as a ratio of the relationship between the light intensity Ls and the distance measurement value d to the reference value $K_\rho$ as in, for example, the following formula, or may be detected as a difference. However, since the following formula is the theoretical principle of detection of abnormality of the optical system, it should be noted that the relationship between the light intensity Ls and the distance measurement value d of the object O may require correction due to various circumstances.

$$Ab = \frac{Ls \cdot d^2}{K_\rho} \quad \text{[Formula 10]}$$

When the abnormality Ab of the optical system in the above formula is less than 1, a decrease in light intensity due to the adhesion of dirt to the optical window (lens, diffuser, etc.), a decrease in received intensity, or a decrease in output of the distance measurement light source, etc., can be suspected. By using an object O having a known reflectivity $\rho_{cb}$ as such a reference value, it is possible to detect abnormality of the optical system regardless of the installation environment of the distance measuring apparatus 10. Furthermore, by using the relationship between the light intensity Ls of the object O and the distance measurement value d as the measurement value of the optical system abnormality (the numerator of the above formula), detection of optical system abnormalities is possible regardless of the distance to the object O.

Figure 3A:
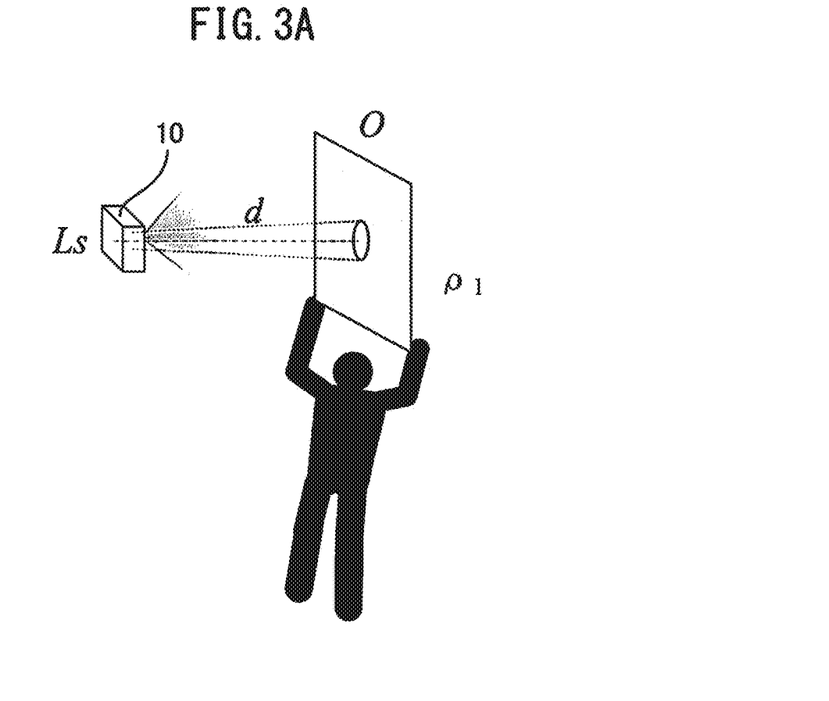
FIG. 3A is a view showing detection of abnormalities according to other embodiment applied to an object having a known reflectivity.

FIG. 3A is a view showing abnormality detection according to other embodiment when an object having a known reflectivity is used. The reference value $K_{\rho 1}$ in the case in which an object O having a reflectivity pi, which is different from the reflectivity $\rho_{cb}$ when the reference value $K_\rho$ is acquired, is used is determined from the above formula using the ratio of the reflectivity $\rho_{cb}$ to the reflectivity $\rho_1$, as in, for example, the following formula.

$$K_{\rho 1} = \frac{\rho_1}{\rho_{cb}} \cdot K_\rho \qquad \text{[Formula 11]}$$

When detecting optical system abnormality, the optical system abnormality detection section 22 calculates the relationship between the light intensity Ls of the object O and the distance measurement value d, and by comparing this relationship with the reference value $K_{\rho 1}$, the abnormality Ab of the optical system of the distance measuring apparatus 10 is detected. The abnormality Ab of the optical system may be detected as the ratio of the relationship of the light intensity Ls and the distance measurement value d to the reference value $K_{\rho 1}$, as in, for example, the following formula, or may be detected as a difference.

$$Ab = \frac{Ls \cdot d^2}{K_{\rho 1}} \qquad \text{[Formula 12]}$$

Figure 3B:
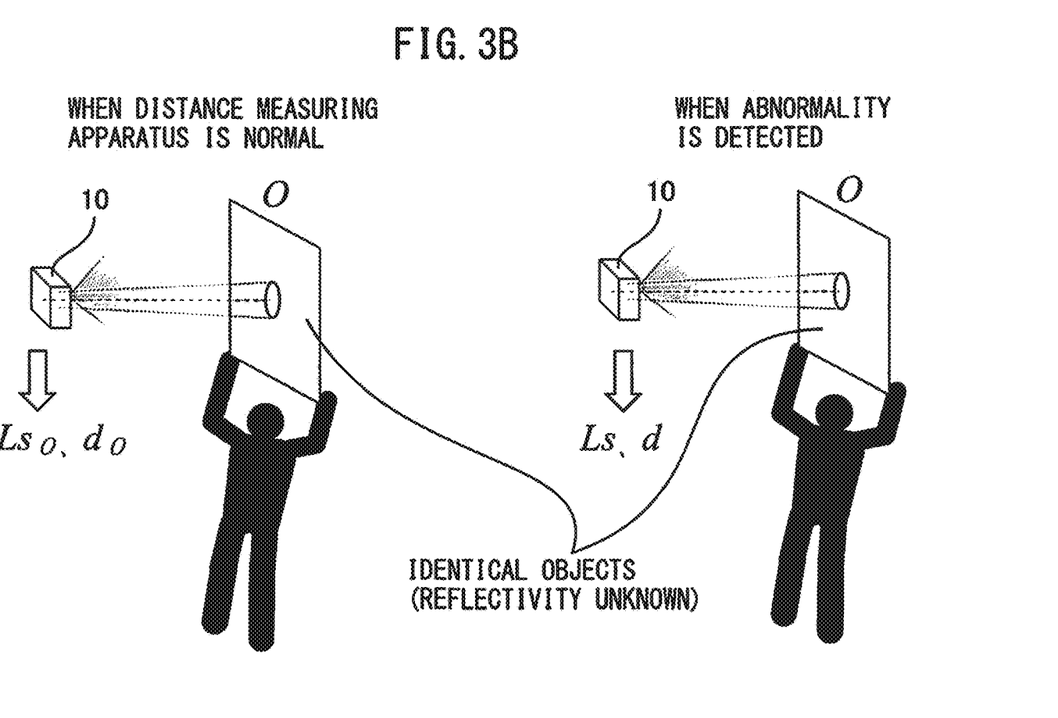
FIG. 3B is a view showing abnormality detection according to yet another embodiment applied to an object having an unknown reflectivity.

FIG. 3B is a view showing abnormality detection according to another embodiment when an object having an unknown reflectivity is used. The above basic formula demonstrates that even for an object O having an unknown reflectivity, a reference value $K_{Ls0d0}$, as in, for example, the following formula, can be determined using the relationship between the measured distance value $d_0$ of the object O acquired when the distance measuring apparatus 10 is normal (e.g., at the time of installation, when maintenance has been completed, etc.) and the light intensity $Ls_0$. Thereafter, abnormality can be detected using identical objects O (i.e., objects which have unknown reflectivities but which have the same reflectivity).

$$K_{Ls0d0} = Ls_0 \cdot (d_0)^2 \qquad \text{[Formula 13]}$$

When detecting optical system abnormality, the optical system abnormality detection section 22 calculates the relationship between the light intensity Ls of the object O and the distance measurement value d, and abnormality Ab of the optical system of the distance measuring apparatus 10 is detected by comparing such relationship with the reference value $K_{Ls0d0}$. The abnormality Ab of the optical system may be detected as the ratio of the relationship between the light intensity Ls and the distance measurement value d to the reference value $K_{Ls0d0}$, as in, for example, the following formula, or may be detected as a difference.

$$Ab = \frac{Ls \cdot d^2}{K_{Ls0d0}} \qquad \text{[Formula 14]}$$

As may be understood from the foregoing, the distance measuring apparatus 10 can determine the reference value from the relationship between the distance measurement value do of the object O having an unknown reflectivity and the light intensity $Ls_0$. In other words, the object may be a unique fixed object (e.g., a unique floor, desk, machine, etc.) the image of which is captured continuously or periodically by the distance measuring apparatus 10. By using the relationship between the light intensity of such a fixed object and the distance measurement value as the measured value of the optical system abnormality (the numerator of the above formula) and the reference value (the denominator of the above formula), optical system abnormality can be detected. In other words, the distance measuring apparatus 10 can automatically maintain the distance measurement accuracy or distance measurement capability without the preparation of a special object having a known reflectivity.

Figure 4:
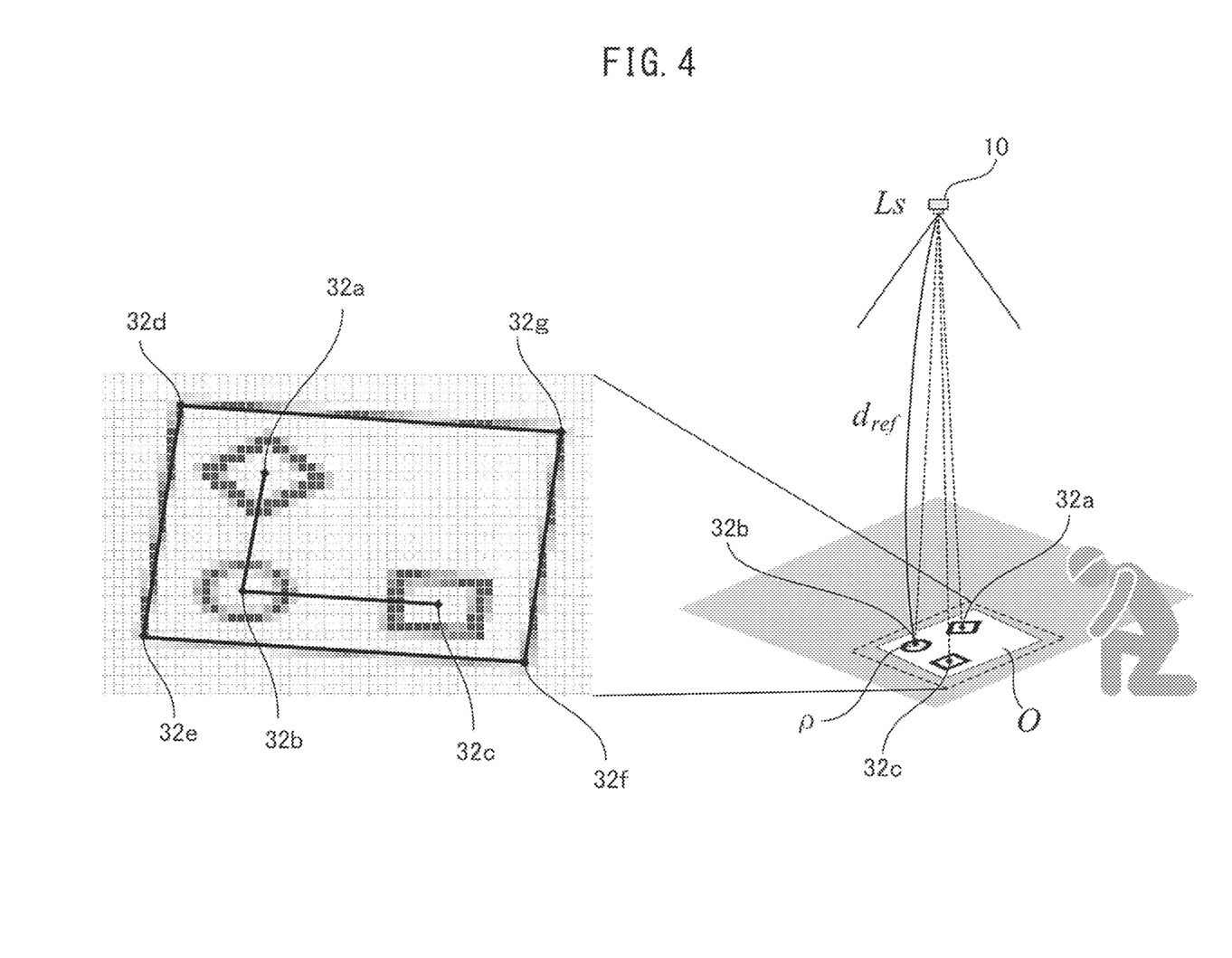
FIG. 4 is an explanatory view showing an example in which optical system abnormality is detected using the distance to an object calculated based on a two-dimensional image.

FIG. 4 is an explanatory view showing an example of optical system abnormality detection in which a distance $d_{ref}$ to the object O geometrically calculated based on the two-dimensional image 31 is used. When the distance measuring apparatus 10 includes a plurality of light receiving elements 15 arranged two-dimensionally, as in, for example, a TOF camera, a two-dimensional image constituted by the light intensity values of each of the light receiving elements 15 is output. A so-called "reference marker" is used as the object O. The reference marker is, for example, a square, white, plate-like member having a known size on which a perfect circle, a square, and a rhombus having known sizes and positional relationships are arranged, and includes a large number of feature points having known three-dimensional coordinate correlations. For example, the feature points may be central portions 32a, 32b, and 32c of the perfect circle, square, and rhombus, respectively, and the corners 32d, 32e, 32f, 32g of the square. Further, the center 32b of the perfect circle of the reference marker is a representative feature point 32b, and the inside of the perfect circle is a portion having a predetermined reflectivity ρ. Note that in another embodiment, optical system abnormality may be detected using arbitrary objects having obvious three-dimensional coordinate correlations in place of the reference marker. Note that "obvious three-dimensional coordinate correlations" means that the relative positional relationships between the plurality of feature points can be known, and it is not always necessary that the correlations of three-dimensional coordinates be known. Specifically, it is not necessary that they be stored in advance in a memory or the like of the distance measuring apparatus 10.

The optical system abnormality detection section 22 detects the reference marker from the two-dimensional image 31 using known image processing, specifies the position coordinates of the various feature points of the reference marker in the image at the sub-pixel level, and geometrically calculates the distance $d_{ref}$ to the center 32b of the perfect circle, which is the representative feature point, from the combination of the position coordinates of the plurality of feature points (generally, four or more) in the image. In order to calculate the distance $d_{ref}$ with higher accuracy, a plurality of values of $d_{ref}$ may be calculated from different combinations of the plurality of feature points, and the average thereof may be used. The optical system abnormality detection section 22 can detect the abnormality Ab of the optical system using the geometrically calculated distance $d_{ref}$ to the reference marker (representative feature point) based on the two-dimensional image 31 in which the reference marker is captured, in place of the measured distance value d, as in, for example, the following formula.

$$Ab = \frac{Ls \cdot d_{ref}^2}{K_\rho} \qquad \text{[Formula 15]}$$

By using the distance $d_{ref}$ to the object O calculated based on the two-dimensional image 31 in this manner, even when distance measurement accuracy is low due to optical system abnormality, it is possible to accurately detect the abnormality Ab of the optical system.

Figure 5A:
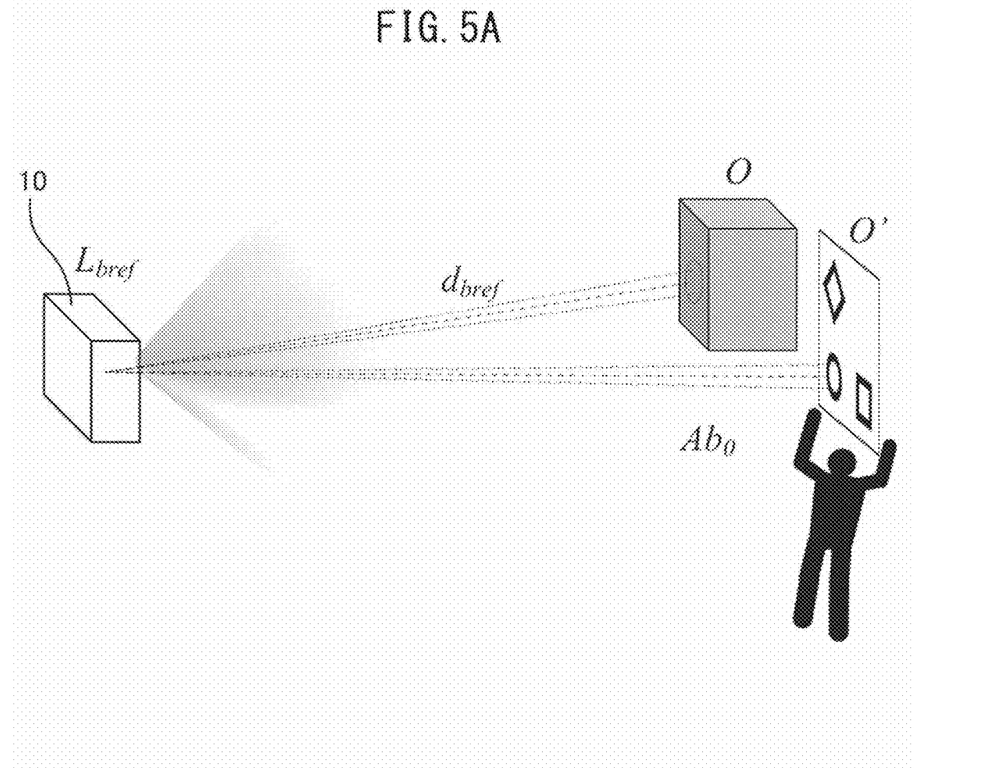
FIG. 5A is an explanatory view showing a method for determining a reference value according to yet another embodiment.
Figure 5B:
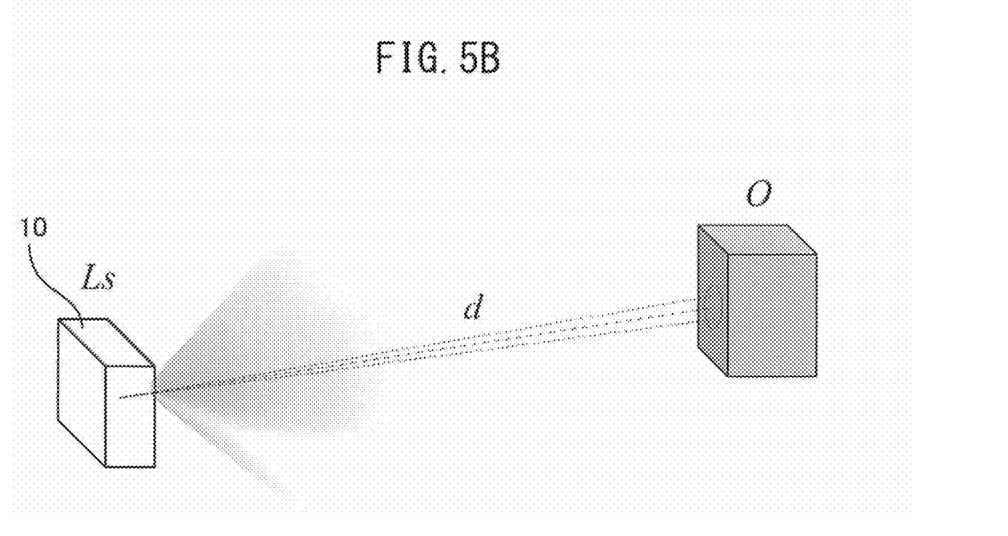
FIG. 5B is an explanatory view showing a method for determining a reference value according to yet another embodiment.

FIGS. 5A and 5B are explanatory views showing methods for determining the reference value according to yet another embodiment. As shown in FIG. 5A, when another object O' such as a reference marker is used, it can be accurately observed that the abnormality $Ab_0$ of the optical system has advanced to some extent. Thus, the reference value $K_{Ab0}$ may be determined using the degree of abnormality $Ab_0$ of the optical system, which has advanced halfway to the observation target object O. The reference value $K_{Abo}$ is determined using the abnormality $Ab_0$ of the optical system detected using another object O' and the relationship between the measured distance value $d_{bref}$ and the light intensity $L_{bref}$, which are related to the observation target object O which is captured simultaneously with another object O', as in, for example, the formula below.

$$K_{Ab0} = \frac{L_{bref} \cdot d_{bref}^2}{Ab_0} \quad \text{[Formula 16]}$$

As shown in FIG. 5B, when detecting optical system abnormality, the optical system abnormality detection section 22 calculates the relationship between the light intensity Ls of the object O and the distance measurement value d, and the abnormality Ab of the optical system of the distance measuring apparatus 10 is detected by comparing such relationship with the reference value $K_{Ab0}$. The optical system abnormality Ab may be detected as the ratio of the relationship between the light intensity Ls and the measured distance value D to the reference value $K_{Ab0}$, as in, for example, the formula below, or may be detected as a difference.

$$Ab = \frac{Ls \cdot d^2}{K_{Ab0}} \quad \text{[Formula 17]}$$

When the reference value $Ab_0$ is determined using the degree of abnormality $Ab_0$ of such an optical system which has advanced halfway to the observation target object O, an object having a known reflectivity, a reference marker, or the like is temporarily used, whereby abnormality of the optical system can be determined using only the observation target object.

Figure 6A:
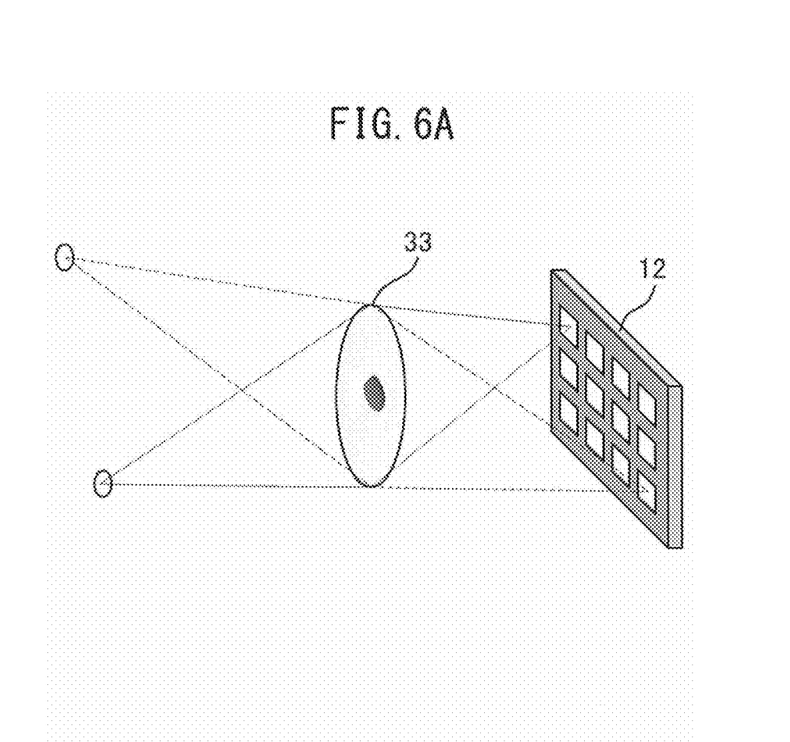
FIG. 6A is an explanatory view showing that the adhesion of spot-like dirt can be regarded as optically equivalent to uniform soiling.
Figure 6B:
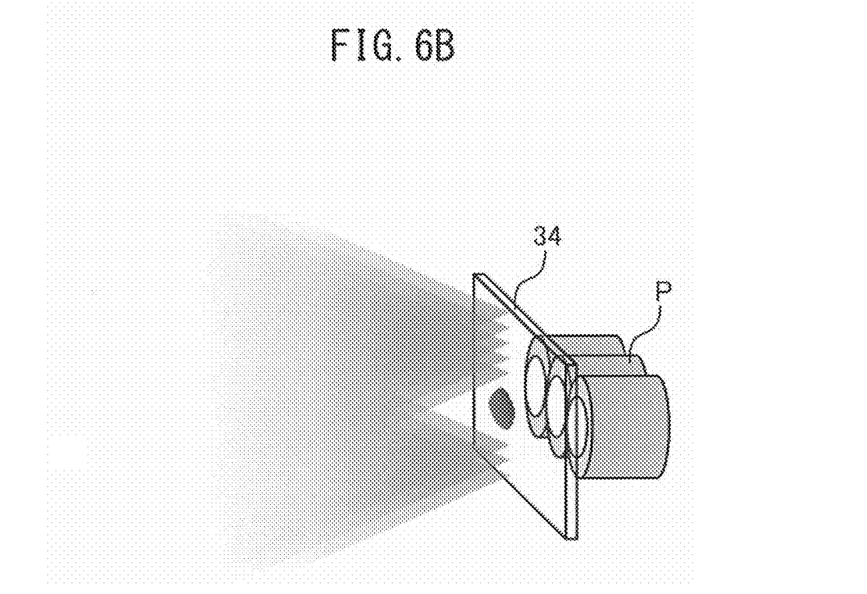
FIG. 6B is a view showing that the adhesion of spot-like dirt can be regarded as optically equivalent to uniform soiling.

FIGS. 6A and 6B are explanatory views showing that spotty soiling can be regarded as optically equivalent to uniform soiling. Examples of the adhesion of dirt to the optical window (e.g., the lens 33, the diffusion plate 34, etc.) among the causes of optical system abnormalities include uniform adhesion such as dust and misting, and spot-like adhesion. As shown in FIG. 6A, when spot-like dirt adheres to the surface of the lens 33, a portion of the image does not become dark, but rather, the entire image becomes dark. The same applies to the diffusion plate 34 shown in FIG. 6B. Thus, it should be noted that when an observation target object having a defined reference value is captured in only a portion of the image, as in the present application, such a situation can be regarded as equivalent to detecting an anomaly of the entire image.

When an optical system abnormality is detected, the optical system abnormality detection section 22 issues a warning command to a warning section 24 (refer to FIG. 1), and outputs the optical system abnormality Ab to the warning section 24. The warning section 24 is constituted by, for example, a speaker, an LED lamp, a display device, a communication control unit, or the like, and outputs the abnormality Ab of optical system to the outside of distance measuring apparatus 10 in accordance with the warning command from the optical system abnormality detection section 22.

According to the above embodiment, the distance measuring apparatus 10 can easily detect abnormality of the optical system from the relationship between the distance measurement value d and the light intensity Ls, and the appropriate timing of cleaning and part replacement of the distance measuring apparatus 10 can be understood based on such abnormality Ab. Additionally, the distance measurement accuracy and distance measurement capability can be maintained.

Though various embodiments have been described in the present description, the present invention is not limited to the embodiments described above, and it can be recognized that various modifications can be made within the scope of the claims described below.

The invention claimed is:

1. A distance measuring apparatus, comprising an irradiation section which irradiates an object with distance measurement light, and a light receiving section which receives reflected light from the object, wherein the distance measuring apparatus outputs a distance measurement value to the object calculated based on a phase difference between the distance measurement light and the reflected light, and a light intensity of the reflected light, the distance measurement apparatus further comprising:
an optical system abnormality detection section which detects an abnormality of an optical system of the distance measuring apparatus by comparing
a relationship $Ls \cdot d^2$ between the distance measurement value d and the light intensity Ls with
a reference value.

2. The distance measuring apparatus according to claim 1, wherein the reference value is determined using a reflectivity of the object.

3. The distance measuring apparatus according to claim 1, wherein the reference value is determined using the relationship between the distance measurement value and the light intensity acquired when the distance measuring apparatus is normal.

4. The distance measuring apparatus according to claim 1, further comprising:
a two-dimensional image generation section which generates a two-dimensional image of a space observed by the distance measuring apparatus based on a light reception amount of the light receiving section, wherein
an abnormality of the optical system is determined using, in place of the distance measurement value, a distance to the object calculated based on the two-dimensional image in which the object, which has a plurality of feature points having obvious three dimensional coordinate correlations, is captured.

5. The distance measuring apparatus according to claim 1, wherein the reference value is determined using an abnormality of the optical system detected using another object which is different from the object, and the relationship between the distance measurement value to the object, which is captured simultaneously with another object, and the light intensity.

* * * * *